United States Patent [19]

Matayabas, Jr. et al.

[11] Patent Number: 5,393,867

[45] Date of Patent: Feb. 28, 1995

[54] POLYETHER POLYMERS DERIVED FROM 3,4-EPXOY-1-BUTENE

[75] Inventors: James C. Matayabas, Jr.; Falling: Stephen N., both of Kingsport, Tenn.

[73] Assignee: Eastman Chemical Company, Kingsport, Tenn.

[21] Appl. No.: 181,735

[22] Filed: Jan. 18, 1994

[51] Int. Cl.$^6$ .................. C08G 59/68; C08G 65/28
[52] U.S. Cl. ...................... 528/412; 568/579; 568/594; 568/596; 568/619; 568/689; 568/690; 528/392; 528/393; 528/405
[58] Field of Search .............. 568/579, 594, 596, 619, 568/689, 690; 528/392, 393, 405, 412

[56] References Cited

U.S. PATENT DOCUMENTS 3,509,118  4/1970  Vandenberg et al. .............. 526/273

FOREIGN PATENT DOCUMENTS

WO 89/02883  4/1989  WIPO .

OTHER PUBLICATIONS

Wagener, *Makromol. Chem.*, 13, 75 (1992).
Tsuruta, *Macromol. Chem.* 111, 236–246, (1968).

*Primary Examiner*—Samuel A. Acquah
*Attorney, Agent, or Firm*—J. Frederick Thomsen; Harry J. Gwinnell

[57] ABSTRACT

Disclosed are novel polyether compounds obtained by the reaction or polymerization of 3,4-epoxy-1-butene in the presence of a palladium(O) catalyst and a nucleophilic initiator compound. The polyether compounds comprise n units of residue (1) and m units of residue (2), wherein the total value of n+m is 2 to 70, m/(n+m) is greater than 0.30 and up to 0.75, and residues (1) and (2) have the structures:

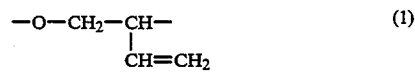

(1)

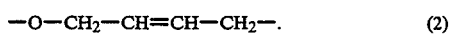

(2)

11 Claims, No Drawings

POLYETHER POLYMERS DERIVED FROM 3,4-EPXOY-1-BUTENE

This invention pertains to certain novel polyether compounds. More specifically, this invention pertains to polyether glycols and alcohols containing repeating units of the structure:

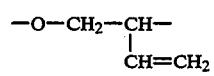  (1)

and

  (2)

This invention also pertains to a process for the preparation of the polyether compounds by the polymerization of 3,4-epoxy-1-butene using a palladium catalyst and a hydroxyl initiator compound.

The polymerization and copolymerization of 3,4-epoxy-1-butene is known. For example, U.S. Pat. No. 2,680,109 discloses the polymerization of unsaturated 1,2-epoxides, including 3,4-epoxy-1-butene, using as catalyst stannic chloride containing a small amount of water. British Patent 869,112 and U.S. Pat. Nos. 3,031,439 and 3,417,064 disclose the copolymerization of 3,4-epoxy-1-butene with ethylene oxide and propylene oxide, using as catalyst strontium carbonate containing a small amount of water.

U.S. Pat. Nos. 3,158,705, 3,158,581, and 3,158,591 disclose the polymerization of 3,4-epoxy-1-butene to give polyethers consisting only of residue (1), using as catalyst trialkylaluminum compounds prereacted with water. These patents also disclose the copolymerization of 3,4-epoxy-1-butene with ethylene oxide, propylene oxide, and epichlorohydrin, using as catalyst trialkylaluminum compounds prereacted with water. U.S. Pat. No. 3,509,118 discloses the preparation of unsaturated polyether glycols containing only residue (1) prepared by n-butyl lithium cleavage of the high molecular weight polymers prepared by the polymerization of 3,4-epoxy-1-butene in benzene using triethylaluminum prereacted with water.

U.S. Pat. No. 3,133,905 discloses the copolymerization of a small amount of 3,4-epoxy-1-butene with ethylene oxide using ethylene glycol as the initiator and solid sodium hydroxide as the catalyst in a pressurized resin pot. U.S. Pat. No. 3,133,905 also discloses the copolymerization of small amounts of 3,4-epoxy-1-butene with tetrahydrofuran using as catalyst boron trifluoride; however, Only about two-thirds of the available 3,4-epoxy-1-butene is incorporated into the copolyether, and the repeat-unit structure is not disclosed. S. S. Ivanchev, et al., J. Polym. Sci., Polym. Chem. Ed., 18, 2051–2059 (1980), investigated the homopolymerization of 3,4-epoxy-1-butene with boron trifluoride etherate and disclose that the rate of termination is much faster than the rate of propagation, leaving much of the 3,4-epoxy-1-butene unreacted. Our investigation of this chemistry corroborates this result; low yields of a thermally-unstable, white material are obtained, and the chloroform-soluble portion of this material contains only residue (1). U.S. Pat. No. 3,468,847 discloses the copolymerization of 3,4-epoxy-1-butene, hexafluoroacetone, ethylene oxide, and propylene oxide, using cesium fluoride as catalyst.

Tsuruta, et al., Macromol. Chem., 111, 236–246 (1968), disclose that diethylzinc prereacted with water polymerizes 3,4-epoxy-1-butene to give a 54% yield of high molecular weight polymer containing only residue (1). Tsuruta, et al., also disclose the isolation of a 3% yield of polymer from 3,4-epoxy-1-butene and uncomplexed diethylzinc as catalyst having evidence of internal double bonds [residue (2)] by infrared spectroscopy. Our investigation of this chemistry resulted in no isolable polymer.

U.S. Pat. No. 2,570,601 discloses the thermally induced polymerization of 3,4-epoxy-1-butene to a hard yellow resin and a small amount of a viscous yellow oil. U.S. Pat. No. 2,570,601 also discloses the thermally induced copolymerization of 3,4-epoxy-1-butene and α-methylstyrene to a brittle, clear, amber thermoplastic resin. U.S. Pat. No. 2,582,708 discloses radically initiated copolymerization of 3,4-epoxy-1-butene and maleic anhydride. U.S. Pat. No. 2,720,530 discloses residues of unsaturated polyether containing only residue (2) formed by vinyl polymerization of 3,4-epoxy-1-butene initiated by excess n-butyraldehyde and benzoyl peroxide. U.S. Pat. Nos. 5,013,806, 5,071,930, and 5,071,931 disclose the preparation of alternating copolymers from 3,4-epoxy-1-butene and maleic anhydride by radical initiation, wherein the copolymers comprise residues (1) and (2) alternating with the maleic anhydride derived diradical.

Finally, Published International PCT Application WO 89/02883 discloses the reaction of 3,4-epoxy-1-butene with certain nucleophiles such as alcohols and carboxylic acids in the presence of a catalyst comprising palladium metal and phosphine ligands. Polymers comprising residues (1) and (2) are not contemplated and the reaction exemplified employs an excess of the nucleophile.

None of the prior art discloses our novel polyether compounds described in more detail hereinbelow or a process whereby the novel polyether compounds may be obtained. The polyether compounds provided by the present invention are comprised of n units of residue (1) and m units of residue (2), wherein the total value of n+m is 2 to 70, m/(n+m) is greater than 0.30 and up to 0.75, i.e., residue (2) constitutes from greater than 30 and up to 75 mole percent of the total moles of residues (1) and (2), and residues (1) and (2) have the structures:

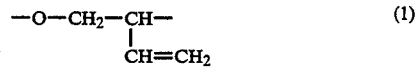  (1)

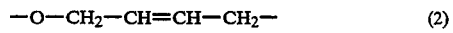  (2)

The polyether compounds may be used in the preparation or formulation of surfactants and other compositions analogous to compositions derived from known polyether polymers.

The process utilized to prepare the above-described polyether compounds is believed to be novel and comprises polymerizing 3,4-epoxy-1-butene in the presence of a palladium(O) catalyst and a hydroxyl initiator compound to obtain the polyether compounds described in the preceding paragraph. The initiator compound may be selected from various nucleophiles such as the hydroxyl compounds disclosed in Published International PCT Application WO 89/02883 cited hereinabove. The initiator compound preferably is selected from various organic hydroxyl compounds such as alcohols, polyols, i.e., polyhydroxyl compounds containing 2 to 6 hydroxyl groups, and hydroxyl-terminated polymers such as hydroxyl-terminated polyether and polyester polymers. When an alcohol is used as the initiator, the polymeric product obtained has a hydroxyl group on one end of the chain (terminal hydroxyl group) and thus is a polymeric alcohol. The other end of the polymer chain is terminated with the residue of the alcohol initiator, e.g., a residue having the formula —O—$R^1$ wherein $R^1$ is the residue of an alcohol, preferably an alkyl group, containing up to about 20 carbon atoms. When a polyhydroxyl compound is used as the initiator, the polymer grows from at least 2 of the hydroxyl groups of the initiator, and the subsequently-obtained polymer is a polyhydroxyl polymer. The residue of the polyhydroxyl initiators may be represented by the formula —O—$R^2$—O— wherein $R^2$ is the residue of a polyhydroxyl initiator. Alkali metal and alkaline earth metal hydroxides and alkoxides may be used as initiators but are not preferred.

Suitable alcohols include low molecular weight organic alcohols and polymeric alcohols which may be linear or branched-chain aliphatic, alicyclic or aromatic. Although secondary or tertiary alcohols may be used, primary alcohols are preferred. Some typically useful alcohol initiators include methyl alcohol, ethyl alcohol, n-butyl alcohol, iso-butyl alcohol, 2-ethylhexyl alcohol, n-decyl alcohol, stearyl alcohol, cetyl alcohol, allyl alcohol, benzyl alcohol, phenol, cresol, and the like. Typically useful glycol initiators include ethylene glycol, 1,2-propanediol, 1,3-propanediol, 1,2-butanediol, 1,4-butanediol, 1,6-hexanediol, 1,4-cyclohexanediol, 1,4-cyclohexanedimethanol, 2,2-dimethyl-1,3-propanediol, 2,2,4-trimethyl-1,3-pentanediol, 2,2,4,4-tetramethyl-1,3-cyclobutanediol, 2-butene-1,4-diol, 1-butene-3,4-diol, benzenediols such as hydroquinone and resorcinol, and the like. Typically useful polymeric alcohols and glycols include polyethylene glycol, polyethylene glycol monomethyl ether, polypropylene glycol, polypropylene glycol monobutyl ether, poly(tetramethylene ether) glycol, and the like. Low molecular weight hydroxyl-terminated polyesters also may function as the hydroxyl initiator compound. Typically useful polyols include glycerol, starch, sucrose, glucose, pentaerythritol, and the like. Water may also be used as the initiator but is not preferred. Diols having 2 to 6 carbon atoms constitute the preferred initiators, i.e., wherein $R^2$ is alkylene of 2 to 6 carbon atoms.

The catalyst employed in the process of the present invention is a palladium(O) complex, e.g., complex of palladium(O) within the range of about 2 to 4 ligands, such as those catalysts disclosed in Published International PCT Application WO 89/02883 cited hereinabove. Suitable ligands include trihydrocarbyl phosphines and trihydrocarbylarsines, e.g., triphenylphosphine, tributylphosphine, trimethylphosphine, 1,2-bis(-diphenylphosphino)ethane, triphenylarsine, tributylarsine, the trisodium salt of tri(m-sulfophenyl)phosphine, and the like. Those skilled in the art recognize that palladium(O) complexes also can be stabilized by other ligands such as, for example, olefins, phosphites, and the like. Tris(dibenzylideneacetone)dipalladium(O) is an example of a specific palladium(O) catalyst containing another type of ligand.

The palladium-ligand catalyst may be preformed or formed in situ, and those skilled in the art recognize that the palladium-ligand catalyst can be generated in a variety of ways. The palladium(O) complex may be supported on a polymer substrate. In this form, one substituent of at least one of the ligands is a repeating unit of a polymer. An example of a commercially available palladium complex supported on a polymer substrate is polymer-supported tetrakis(triphenylphosphine)palladium(O) Catalog No. 24815-0, available from Aldrich Chemical Co., Inc. The amount of the palladium(O) catalyst which may be used can vary substantially depending, for example, on process conditions and the particular palladium compound employed. In batch operation of the process, the amount of catalyst used typically is in the range of 0.4 to 1.0 mole percent based on the moles of palladium(O) metal and equivalents of initiator.

The polymerization reaction normally is conducted in the absence of solvent. However, inert solvents such as hydrocarbons, chlorinated hydrocarbons, and the like may be used if desired. Examples of such solvents include benzene, toluene, xylene, heptane, methylene chloride, chloroform, and the like.

The process of the present invention may be carried out at temperatures in the range of about −40° to 60° C., depending upon the choice of initiator, solvent, and catalyst. The polymerization temperature affects the ratio of the repeating units set forth above, with lower polymerization temperatures generally favoring the formation of residues (2):

$$—O—CH_2—CH=CH—CH_2— \qquad (2)$$

Temperatures of about −10° to 50° C. are preferred. Reaction pressure is not an important part of our novel process and, therefore, the process typically is performed at approximately atmospheric pressure although pressure moderately above or below atmospheric may be used.

In the operation of our novel process, the primary reactant, 3,4-epoxy-1-butene, is added to a mixture of the palladium(O) catalyst and the nucleophilic initiator compound. Slow addition of 3,4-epoxy-1-butene is preferred for controlling the heat of reaction, controlling the product molecular weight and molecular weight distribution, minimizing side reactions, and favoring the formation of residue (2). The polymerization reaction generally is rather rapid, and reaction usually is complete immediately after addition of the 3,4-epoxy-1-butene or up to about 16 hours after the completion of the addition, depending upon the rate of 3,4-epoxy-1-butene addition, temperature, and catalyst activity.

The 3,4-epoxy-1-butene may be added all at once or, preferably, slowly or in stepwise increments to a mixture of the catalyst and the initiator. Stepwise addition of the 3,4-epoxy-1-butene monomer gives stepwise increase in polymer molecular weight; thus, molecular weight control is readily achieved by the stoichiometry of monomer to initiator. A wide variety of molecular weights may be achieved, but the molecular weights are generally controlled to provide polymers with molecular weights of about 500 to 3000 for use as condensation polymer intermediates.

It is apparent from the above process description that the polyether polymers of the present invention can comprise, in addition to the 3,4-epoxy-1-butene residues, a minor or major amount, e.g., typically at least 1 weight percent, of the residue of a nucleophilic initiator compound. For example, if a polymeric initiator, e.g., a hydroxyl-terminated polyoxyalkylene polymer, is employed and the number of repeat units of 3,4-epoxy-1-butene residues is relatively low, the 3,4-epoxy-1-butene residue content of the polymer may be less than 10 weight percent. On the other hand, if the initiator employed is a low molecular weight compound such as methanol or ethylene glycol, the 3,4-epoxy-1-butene residues may constitute greater than 99 weight percent of the polymer. The polymers typically comprise at least 80 weight percent, preferably at least 90 weight percent, 3,4-epoxy-1-butene residues.

Our novel polyether polymers preferably are comprised of n units of residue (1) and m units of residue (2), wherein the total value of n+m is about 7 to 50, and m/(n+m) is 0.40 to 0.75. The polymers are further characterized in that at least 95% of the terminal hydroxyl groups are primary (rather than secondary) hydroxyl groups. J-resolved NMR and $^{13}$C NMR analyses of the polyether polymers of the present invention provide no evidence of secondary hydroxyl carbons. The primary hydroxyl groups (and thus the polymers) are more reactive for condensation polymerization reactions in general. The polyether polymers normally have a polydispersity value of less than 3, preferably in the range of 1 to 1.7 and most preferably in the range of 1 to 1.5. The polyether polymers wherein the total value of n+m is about 10 to 30 are particularly preferred. The preferred polyethers contain from about 5 to 20 weight percent, based on the weight of the polyether polymer, of hydroxyl initiator residues, preferably residues having the formula —O—R$^2$—O— wherein R$^2$ is alkylene of 2 to 6 carbon atoms.

The preparation of the novel polyether polymers of the present invention and the operation of the process are further illustrated by the following examples. NMR spectra are obtained on a 300 or 400 MHz NMR spectrometer with samples dissolved in deuterated chloroform containing tetramethylsilane as an internal standard or deuterated acetone. The value of m/(n+m) is determined by comparison of the integrated NMR absorptions of residues (1) and residues (2), i.e.,

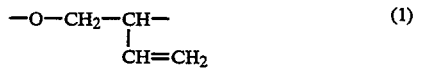

(1)

and

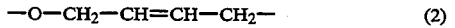

(2)

and all reported values relate only to the 3,4-epoxy-1-butene monomer units added and is, therefore, exclusive of the initiator fragment.

Absolute molecular weight distributions are determined by size-exclusion chromatography (SEC) with viscometry detection in tetrahydrofuran using four 10 μm PLgel mixed-bed columns. Absolute molecular weights are calculated from the viscosity data and a universal calibration curve constructed from narrow molecular weight distribution polystyrene standards. The value of n+m is determined from the SEC-determined number average molecular weight. Hydroxyl numbers are determined from titration of the acetic acid formed by reaction of the sample with acetic anhydride.

EXAMPLE 1

Tetrakis(triphenylphosphine)palladium(O) (0.25 g, 0.22 mmole) and 1,4-butanediol (3.62 g, 40.0 mmole) are charged to a 3-neck, 100-mL, round-bottom flask having an argon atmosphere and equipped with a thermocouple (to monitor the temperature), mechanical stirrer, and a septum with argon inlet. Stirring is begun and a total of 41.8 mL (520 mmole) of 3,4-epoxy-1-butene is added dropwise at a rate of 9 mL/hour by syringe pump. After about 1 mL of 3,4-epoxy-1-butene is added, the reaction flask is cooled with a cooling bath composed of water and ice and having a temperature of 0° to 5° C. The reaction temperature is maintained between 10° and 15° C. by cooling for the duration of the 3,4-epoxy-1-butene addition. After addition is complete, the cooling bath is removed, and the reaction mixture is allowed to warm to room temperature. The resulting clear, yellow oil has a n+m value of approximately 17, a m/(n+m) value of 0.59, a number average molecular weight (Mn) of 1300, a weight average molecular weight (Mw) of 1800, a polydispersity value (Mw/Mn) of 1.39; and a hydroxyl number of 95.27. J-resolved NMR and $^{13}$C NMR analyses of this polyether product shows that essentially all of the terminal hydroxyl groups are primary hydroxyls since no secondary hydroxyl groups are detected.

EXAMPLE 2

The procedure of Example 1 is repeated using a cooling bath composed of ethylene glycol and Dry Ice and having a temperature of −15° to −25° C. The reaction temperature is maintained between −5° and 5° C. The resulting clear, yellow oil has a n+m value of approximately 15 and a m/(n+m) value of 0.65; Mn=1110 and Mw/Mn=1.38; and hydroxyl number=130.9.

EXAMPLE 3

The procedure of Example 1 is repeated without using a cooling bath. The reaction temperature increases upon the addition of 3,4-epoxy-1-butene and is maintained between 40° and 50° C. by controlling the rate of addition. The resulting clear, yellow oil has a n+m value of approximately 14 and a m/(n+m) value of 0.48; Mn=1038 and Mw/Mn=1.44; and hydroxyl number=128.7.

EXAMPLE 4

The experiment in Example 3 is conducted using 1.67 g (40.0 mmole) of lithium hydroxide in place of 1,4-butanediol. The resulting yellow oil is dissolved in 100 mL of methylene chloride and 40 mL of water. Enough dilute hydrochloric acid is added so that the aqueous layer is neutral or slightly acidic to pH paper. The layers are separated, and the methylene chloride is washed with water, dried over magnesium sulfate, filtered, and evaporated to produce 36.6 g of a clear, yellow oil having a n+m value of approximately 42 and a m/(n+m) value of 0.31; Mn=3245 and Mw/Mn=2.73; and hydroxyl number=23.36.

EXAMPLE 5

The procedure of Example 1 is repeated using 0.27 g (0.20 mmole) of tetrakis(triphenylarsine)palladium(O) in place of tetrakis(triphenylphosphine)palladium(O). The resulting clear, colorless oil has a n+m value of approximately 15 and a m/(n+m) value of 0.56; Mn=1185 and Mw/Mn=1.23; and hydroxyl number=129.8.

EXAMPLE 6

The procedure of Example 5 is repeated using a solution of 80 parts by volume 3,4-epoxy-1-butene and 20 parts by volume isopropanol. The resulting clear, yellow oil has a n+m value of approximately 12 and a m/(n+m) value of 0.60; $M_n=950$ and $M_w/M_n=1.17$; and hydroxyl number=162.5.

EXAMPLE 7

The procedure of Example 1 is repeated using 4.33 g (40.0 mmole) of benzyl alcohol in place of 1,4-butanediol. The resulting clear, yellow oil has a m/(n+m) value of 0.46 and hydroxyl number=48.59.

EXAMPLE 9

The experiment in Example 7 is conducted using 100 mL of heptane as solvent. The clear, yellow oil is isolated by evaporating the volatiles and has a m/(n+m) value of 0.32.

EXAMPLE 10

The procedure of Example 1 is repeated using a total of 6.4 mL (80 mmoles) of 3,4-epoxy-1-butene. The resulting clear, colorless oil has a n+m value of approximately 2 and a m/(n+m) value of 0.63.

EXAMPLE 11

The procedure of Example 1 is repeated using a total of 70 g (1.0 mole) of 3,4-epoxy-1-butene. The resulting clear, yellow oil has a n+m value of approximately 26 and a m/(n+m) value of 0.48.

EXAMPLE 12

The procedure of Example 5 is repeated using a total of 6.4 mL (80 mmoles) of 3,4-epoxy-1-butene. The resulting clear, colorless oil has a n+m value of approximately 2 and a m/(n+m) value of 0.73.

EXAMPLE 13

To a 3-neck, 300-mL, round-bottom flask having an argon atmosphere and equipped with a thermocouple, mechanical stirrer, and a septum with argon inlet is charged tetrakis(triphenylphosphine)palladium(O) (0.25 g, 0.22 mmole) and 1,4-butanediol (7.22 g, 80.0 mmole). Stirring is begun and a total of 83.2 mL (1040 mmole) of 3,4-epoxy-1-butene is added dropwise at a rate of 9 mL/hr by syringe pump. After about 1 mL of 3,4-epoxy-1-butene is added, the reaction flask is cooled with a cooling bath composed of water and ice and having a temperature of 0° to 5° C. The reaction temperature is maintained between 10° and 15° C. by cooling for the duration of the 3,4-epoxy-1-butene addition. After complete addition, the cooling bath is removed, and the reaction is allowed to warm to room temperature. The resulting clear, yellow oil is an unsaturated polyether glycol having a n+m value of about 15; a m/(n+m) value of about 0.65; $M_n=1300$ and $M_w/M_n=1.39$; and hydroxyl number=101.8.

The invention has been described in detail with particular reference to preferred embodiments thereof, but it will be understood that variations and modifications will be effected within the spirit and scope of the invention.

We claim:

1. A polyether polymer comprising n units of residue (1) and m units of residue (2), wherein the total value of n+m is 2 to 70, m/(n+m) is greater than 0.30 and up to 0.75, and residues (1) and (2) have the structures:

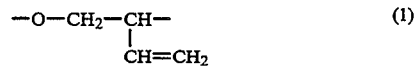

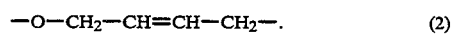

2. A polymer according to claim 1 wherein at least 95 percent of the terminal hydroxyl groups are primary hydroxyl groups and the polymer has a polydispersity value of less than 3.

3. A polyether polymer comprising n units of residue (1) and m units of residue (2), wherein the total value of n+m is 7 to 50, m/(n+m) is 0.40 to 0.75, and residues (1) and (2) have the structures:

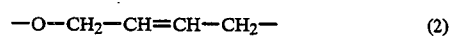

wherein residues (1) and (2) constitute at least 80 weight percent of the polymer.

4. A polymer according to claim 3 wherein at least 95 percent of the terminal hydroxyl groups are primary hydroxyl groups and the polymer has a polydispersity value of 1 to 1.7.

5. A polyether polymer comprising n units of residue (1) and m units of residue (2), wherein the total value of n+m is 10 to 30, m/(n+m) is 0.40 to 0.75, and residues (1) and (2) have the structures:

wherein residues (1) and (2) constitute at least 80 weight percent of the polymer; at least 95 percent of the terminal hydroxyl groups are primary hydroxy groups; and the polymer has a polydispersity value of 1 to 1.7.

6. A polyether polymer comprising n units of residue (1) and m units of residue (2), wherein the total value of n+m is 10 to 30, m/(n+m) is 0.40 to 0.75, and residues (1) and (2) have the structures:

wherein residues having the formula —O—$R^4$ or —O—$R^5$—O— wherein $R^4$ and $R^5$ are residues of a hydroxyl initiator compound constitute at least 1 weight percent of the polyether polymer; at least 95 percent of the terminal hydroxyl groups are primary hydroxyl groups; and the polymer has a polydispersity value of 1 to 1.7.

7. A polyether polymer according to claim 6 wherein residues having the formula —O—$R^5$—O— wherein $R^5$ is alkylene of 2 to 6 carbon atoms constitute 5 to 20 weight percent of the polyether polymer.

8. Process for the preparation of a polyether polymer comprising n units of residue (1) and m units of residue (2), wherein the total value of n+m is 2 to 70, m/(n+m) is greater than 0.30 and up to 0.75, and residues (1) and (2) have the structures:

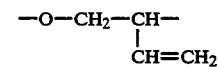 (1)

 (2)

which comprises polymerizing 3,4-epoxy-1-butene in the presence of a palladium(O) catalyst and a nucleophilic initiator compound.

9. The process of claim 8 wherein the palladium(O) catalyst contains 2 to 4 ligands selected from trihydrocarbylphosphines and trihydrocarbylarsines and the process is carried out at a temperature of about $-40°$ to $60°$ C.

10. Process for the preparation of a polyether polymer comprising n units of residue (1) and m units of residue (2), wherein the total value of n+m is 7 to 50, m/(n+m) is 0.40 to 0.75, and residues (1) and (2) have the structures:

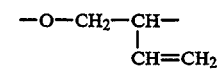 (1)

 (2)

which comprises polymerizing 3,4-epoxy-1-butene at $-40°$ to $60°$ C. in the presence of a catalyst comprising palladium(O) and 2 to 4 trihydrocarbylphosphine ligands and an organic hydroxyl initiator compound.

11. The process of claim 10 wherein 3,4-epoxy-1-butene is added slowly or in increments to a mixture of a catalyst comprising palladium(O) and 4 trihydrocarbylphosphine ligands and a glycol initiator compound containing 2 to 6 carbon atoms.

* * * * *